F. ZBIKOWSKI.
MILK BOX.
APPLICATION FILED MAY 7, 1917.
1,239,330. Patented Sept. 4, 1917.
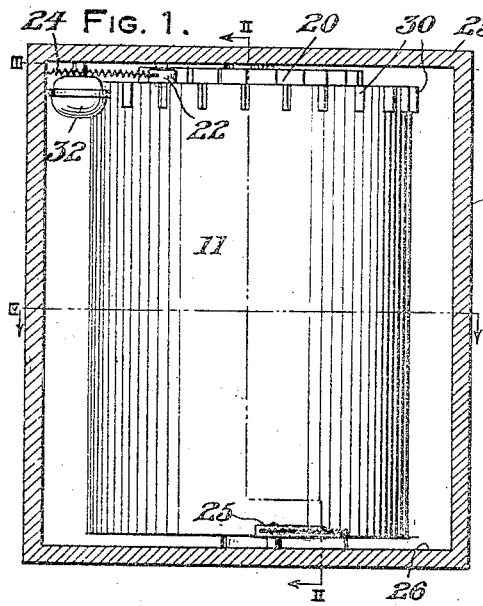
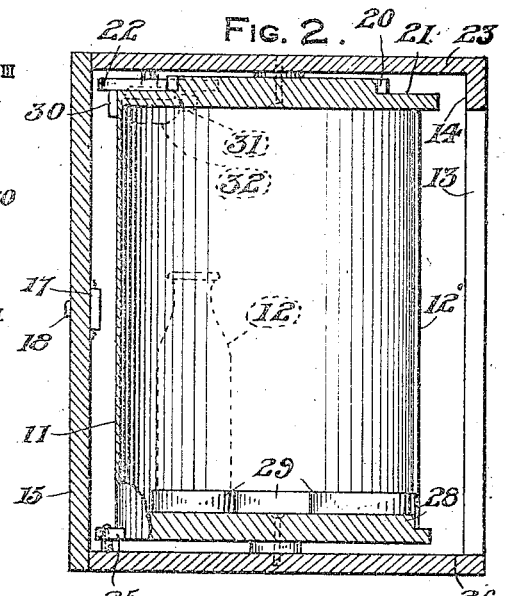
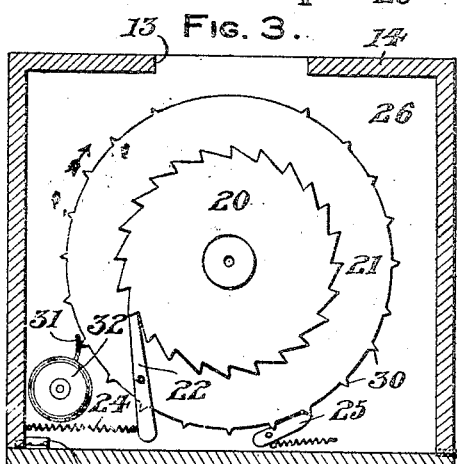
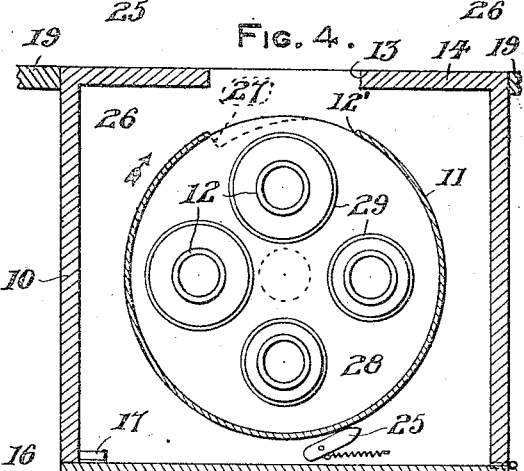
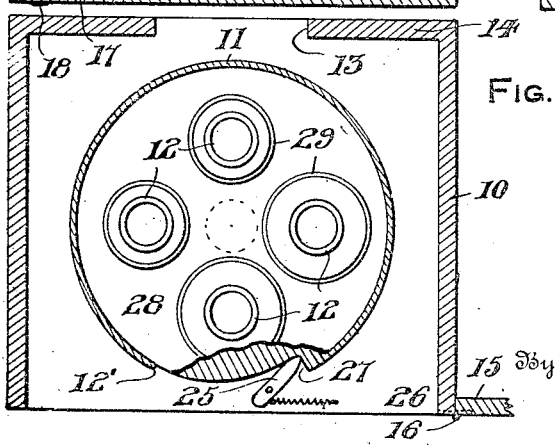
Inventor
F. Zbikowski
By A. M. Wilson
Attorney

UNITED STATES PATENT OFFICE.

FRANK ZBIKOWSKI, OF BESSEMER, PENNSYLVANIA.

MILK-BOX.

1,239,330.  Specification of Letters Patent.  Patented Sept. 4, 1917.

Application filed May 7, 1917. Serial No. 166,902.

*To all whom it may concern:*

Be it known that I, FRANK ZBIKOWSKI, a citizen of the United States, residing at Bessemer, in the county of Lawrence and State of Pennsylvania, have invented certain new and useful Improvements in Milk-Boxes, of which the following is a specification.

This invention relates to certain new and useful improvements in milk boxes.

The primary object of the invention is the provision of a device adapted to prevent the theft of bottles of milk which are vended from house to house and are ordinarily delivered upon door steps and in a convenient and easily accessible position, the present device providing a sanitary receiving member preventing any extraction of the bottles exteriorly of the house.

A further object of the device is the provision of a receiving member for vending milk bottles arranged for sounding an alarm when the bottles are deposited therein for notifying the housekeeper that the milk has arrived while the bottle is readily guarded by the milkman against any access thereto exteriorly of the house while the bottles are positioned for removal interiorly of the house.

With these general objects in view and others that will appear as the nature of the invention is better understood, the same consists in the novel construction, combination and arrangement of parts hereinafter fully described, illustrated in the accompanying drawing and pointed out in the appended claim.

In the drawing forming a part of this application and in which like numerals refer to corresponding parts throughout the several views:

Figure 1 is a vertical sectional view of the device taken adjacent the inner door thereof.

Fig. 2 is a vertical sectional view taken upon line II—II of Fig. 1.

Figs. 3 and 4 are horizontal sectional views taken respectively upon lines III—III and IV—IV of Fig. 1, and, Fig. 5 is similar to Fig. 4 with the device in its open position for the removal of the milk bottle.

The present device may be located at any desirable point and broadly consists of a box member or casing 10 having a hollow cylindrical container 11 journaled therein adapted to receive a milk bottle such as 12 therein through a side opening 12' in the cylinder, this being possible when the opening 12' is brought into substantial alinement with the opening door 13 in the outer wall 14 of the casing 10.

The casing 10 is preferably arranged with the outer wall 14 positioned exteriorly of or readily accessible from the exterior of the house while the inner wall 15 of the casing constitutes a hinged door, whereby the bottle 12 may be removed interiorly of the house by revolving the cylinder 11 until the opening 12' thereof is positioned adjacent the door 15, the latter being readily swung open upon its hinge 16 and provided with a suitable catch 17 releasable by a handle 18. A house or a shed wall 19 is indicated in Fig. 4 of the drawing showing the preferable arrangement of the casing 10 relatively thereto.

A ratchet wheel 20 is arranged upon the top 21 of the cylinder 11 and is adapted for engagement by a pawl 22 pivoted to the top 23 of the casing 10 and provided with a suitable spring 24 for maintaining the pawl in operative contact with the said wheel 20. The said pawl and ratchet mechanism permits the cylinder 11 to be revolved in only one direction, it being noted that a pivoted spring-influenced stop 25 is arranged upon the bottom 26 of the casing 10 for engaging within a notch 27 in the bottom 28 of the cylinder 11 when the cylinder is revolved for bringing the opening 12' adjacent the door 15.

It will be seen that the device being normally arranged as shown in Fig. 4 of the drawing, the milkman may readily insert the bottle 12 through the casing 10 and within the cylinder 11 through the opening 12' thereof for placing the bottle within a suitable socket 29 upon the cylinder bottom 28. The milkman will then revolve the cylinder in the direction permitted by the pawl and ratchet member 20 and 22, the same being shown by the arrows of Figs. 3 and 4 of the drawings and when the opening 12' arrives at its inner position adjacent the door 15 the stop 25 will enter the notch 27 preventing any further rotation of the cylinder from a point exteriorly of the building wall 19. The door 15 is then opened when desired by the person within the house and the milk bottle 12 removed through the cylinder opening 12' and the stop 25 being then readily accessible interiorly of the house, the said top will be removed from the notch 27 by the operator and the cylinder 11 further revolved for again positioning upon 12' in substantial alinement with the outer door opening 13 of the casing 10.

Radially projecting teeth 30 are provided adjacent the top of the cylinder 11 adapted to engage the operating lever 31 of an alarm bell 32 whenever the cylinder 11 is revolved. By this arrangement the alarm bell 32 will be sounded when the milkman revolves the cylinder 11 with the milk bottle 12 positioned therein, thereby notifying the housewife that the milk has arrived and that the door 15 may be opened for gaining access thereto. A serviceable arrangement is thus provided which will prevent the theft of milk bottles which are delivered at the house while the occupant of the house may readily remove the same, the bottles being retained in a safe and sanitary condition while the alarm member advises the housewife as soon as the milk is accessible.

What I claim as new is:—

A bottle holder comprising a casing having a receiving opening in one side thereof and a closure door at its opposite side, a cylindrical receiver journaled upright within the casing having a side opening adapted for normal positioning in alinement with the said receiving opening, bottle receiving sockets within the said receiver, projecting teeth arranged adjacent the top of said receiver, an alarm within the casing arranged with its operating lever in the path of movement of the said teeth, pawl and ratchet connections between the said receiver and the casing arranged above the receiver, the said receiver having a peripheral stop notch at the bottom thereof adjacent the opening of the receiver and a pivoted stop carried by the casing adjacent the hinged door thereof adapted for engagement within said notch.

In testimony whereof I affix my signature.

FRANK ZBIKOWSKI.